US008577633B2

United States Patent
Patel

(10) Patent No.: US 8,577,633 B2
(45) Date of Patent: Nov. 5, 2013

(54) GYRO ZERO TURN RATE OFFSET CORRECTION OVER TEMPERATURE IN A PERSONAL MOBILE DEVICE

(75) Inventor: Parin Patel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 750 days.

(21) Appl. No.: 12/794,531

(22) Filed: Jun. 4, 2010

(65) Prior Publication Data
US 2011/0301900 A1 Dec. 8, 2011

(51) Int. Cl.
*G06F 19/00* (2011.01)
(52) U.S. Cl.
USPC ............... 702/72; 702/94; 702/99; 702/104; 702/150; 73/1.37; 73/1.77; 73/497; 73/504.18; 324/162
(58) Field of Classification Search
USPC ............... 702/72, 94, 99, 104, 150; 33/356; 73/1.37, 1.77, 497, 504.18
See application file for complete search history.

(56) References Cited

U.S. PATENT DOCUMENTS

| | | | |
|---|---|---|---|
| 5,527,003 A | | 6/1996 | Diesel et al. |
| 2002/0169553 A1 | | 11/2002 | Perlmutter et al. |
| 2003/0036847 A1 | | 2/2003 | Geier et al. |
| 2008/0234935 A1 | | 9/2008 | Wolf et al. |
| 2009/0093984 A1 | * | 4/2009 | Choi et al. ............... 702/104 |
| 2010/0307016 A1 | * | 12/2010 | Mayor et al. ............... 33/356 |

FOREIGN PATENT DOCUMENTS

KR 1020040062038 7/2004

OTHER PUBLICATIONS

"DSM200 NMEA2000® Multi-Function Graphic Display", User's Manual, Revision 1.7, Copyright© 2006 Maretron, LLC, Phoenix, AZ, USA, Maretron Manual Part #: M000201, (p. i, pp. 29-30).
"SSC200 Solid State Rate/Gyro Compass", User's Manual, Revision 1.7, Copyright© 2006, Maretron, LLC, Phoenix, AZ, USA, Maretron Manual Part #: M000401, 43 pages.

* cited by examiner

*Primary Examiner* — Jonathan C Teixeira Moffat
*Assistant Examiner* — Hien Vo
(74) *Attorney, Agent, or Firm* — Fish & Richardson P.C.

(57) ABSTRACT

A personal mobile device housing contains a display screen, a wireless telephony communications transceiver, and a battery charger interface. A temperature sensor and a gyro sensor whose zero turn rate output contains an offset are also included. A lookup table has gyro zero turn rate offset correction values associated with different temperature values. A programmed processor accesses the lookup table to correct the output of the gyro sensor for zero turn rate offset. It is automatically determined, during in-the-field use, when the device is in a motionless state, and the output of the temperature and gyro sensors are read. The read gyro output is written to the lookup table as part of a pair of associated temperature and zero turn rate offset correction values. Other embodiments are also described and claimed.

13 Claims, 5 Drawing Sheets

GYRO ZERO TURN RATE OFFSET CORRECTION OVER TEMPERATURE IN A PERSONAL MOBILE DEVICE

An embodiment of the invention relates to personal mobile devices that include a gyroscope (gyro) whose zero turn rate output may contain an error (also referred to as offset or bias), and techniques for correcting (also referred to as calibrating or compensating) for the effect of such offset over the full operating temperature range of the device. Other embodiments are also described.

BACKGROUND

Gyroscopes (or gyros, where the term is generically used here to refer to angular rate, turn rate, or turn speed sensors) have been suggested to be included in consumer electronics personal mobile devices such as multi-function cellular phones and smart phones. In such a multifunction handheld portable device, the gyro may be used by applications that measure heading changes (for example, in-the-field of navigation) or for measuring the rate of rotation as may be needed by a video game application. The types of gyro that are practical or suitable for use in such devices include micro electromechanical system, MEMS, type vibratory gyros. A MEMS vibratory gyro is particularly suitable for use in a handheld device, because of its relatively small size, low power consumption, suitability for high volume manufacture and low cost. However, such a gyro may be particularly sensitive to temperature, in that its turn rate output signal (indicating the sensed rate at which the gyro package is rotating about a given axis) exhibits significant fabrication process variation as well as temperature variation.

The gyro can be calibrated for zero rate offset during manufacturing test, as follows. The gyro is kept motionless in a temperature-controlled environment. Its output is then sampled and recorded at different temperatures. This offset data is then stored in a lookup table, together with the associated temperature values at which they were collected. The table is then provided with the gyro to a system manufacturer who integrates them into a personal mobile device. A calibration process in the mobile device can then periodically read a temperature sensor that may be integrated with the gyro, lookup the associated offset correction from the table, and then apply the correction to the output of the gyro.

SUMMARY

The one-time calibration process described above that can be performed during the time of manufacturing test of a multi-function handheld mobile device requires not just a controlled temperature environment, but also a significant period of time to test each individual specimen of the device. That is because a gyro that is integrated in such a device will experience a relatively wide range of temperatures during in-the-field use. Such devices are used in a wide range of ambient temperatures, e.g. indoors and outdoors, in hot weather and cold weather. In addition, the tight confines inside the housing of such devices coupled with power-intensive functions being performed in them, such as music and video playback, wireless communications, and video game processing, can cause a large swing in the temperature of the gyro that is also inside the housing. However, the temperature range that is used for gyro calibration at the factory should be as short as possible, so as not to spend an inordinate amount of time just for testing a single function of such a multi-function device, in a high volume manufacture setting.

In accordance with an embodiment of the invention, a multi-function handheld device has a housing in which a gyro sensor and a temperature sensor have been integrated at the factory. The device also includes a programmed processor, which accesses a lookup table to correct the output of the gyro sensor for zero turn rate offset (ZRO). To populate the lookup table, the processor automatically determines, during in-the-field use of the device or "normal use" by its end user, when the device is in a motionless state. It then reads the output of the temperature sensor as well as the output of the gyro sensor at that point, and writes the read gyro output value to the lookup table as one of a pair of associated temperature and ZRO correction values. The lookup table need only have been filled partially at the factory, using an initial calibration or testing process that can be performed relatively quickly on the device, with very few temperature data points. Once the device is in-the-field, however, the lookup table may be further developed or populated with many more temperature data points in a manner that is inconspicuous to its end user, as the device is subjected to the wide range of temperatures that are typically expected for such a device.

The in-the-field learning of ZRO corrections over temperature may also be used to update pre-existing entries in the lookup table. The ZRO of the gyro sensor may drift or vary over time. The learning process may be used to update the table so that gyro readings remain accurate throughout the life of the personal mobile device, again without requiring a significant amount of time calibrating the gyro during manufacturing test of the device.

A further aspect of the invention lies in performing a "sanity check" for a newly read, ZRO value, before writing the value to the lookup table. Since the process for populating the lookup table is performed in-the-field, this may present unexpected events (in contrast to a laboratory environment that is well controlled during manufacturing test). A verification process is described that checks whether the read offset value is significantly different than a preexisting correction value that is in an entry of the table whose temperature value is sufficiently close to the current temperature of the gyro. The preexisting entry may have been determined at the factory during manufacturing test. If the read gyro output is significantly different than the preexisting value, then the read gyro output is likely to be incorrect or corrupted. The corruption may have occurred because of acoustic vibrations that cannot be detected using the accelerometer but that nonetheless interact with a mechanical gyro sensor in a way that corrupts the output of the gyro sensor. The sanity check serves to prevent incorrect ZRO values in such a situation to be written to the lookup table.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
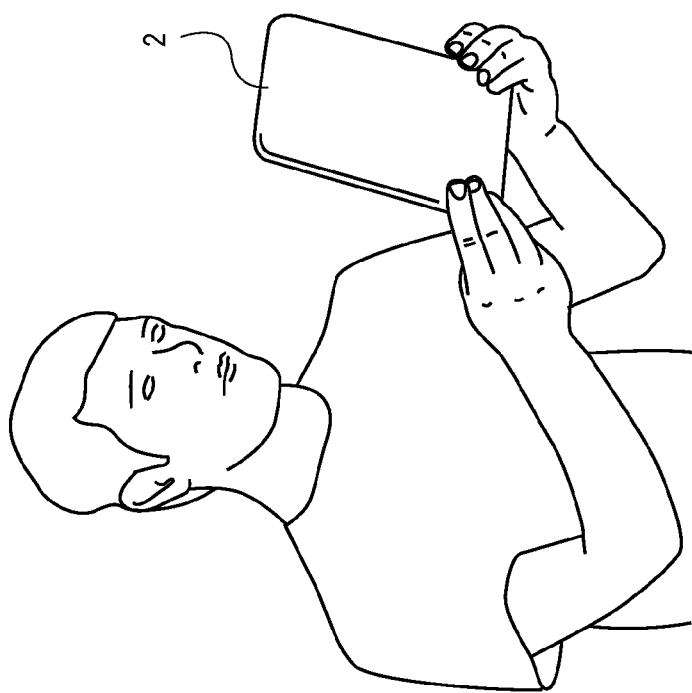
FIG. 1 shows a human user holding different types of a multi-function handheld mobile device, namely a smart phone and a handheld tablet-like personal computer.
Figure 1:
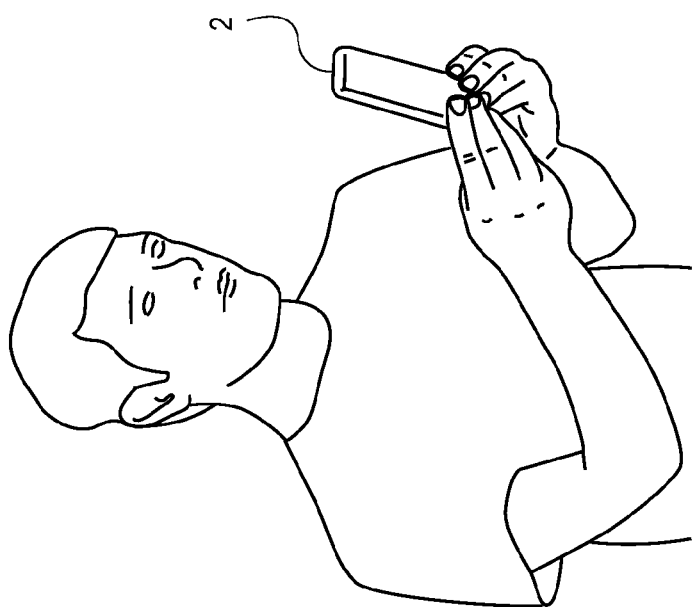

FIG. 1 shows two instances of a multi-function handheld mobile device 2 (also referred to here as a personal mobile device) held in the hands of an end user or owner of the device 2. In one instance, the device 2 is a smart phone or a multi-function cellular phone with several features typically available in modern handheld wireless communication devices, such as a touch screen interface, music and video file recording and playback, digital camera, video games, and wireless-enabled applications such as voice over internet protocol telephony, electronic calendar, web browser, and email. In another instance, the device 2 may be a larger, handheld tablet-like computer such as an iPad™ device by Apple Inc.

Figure 2:
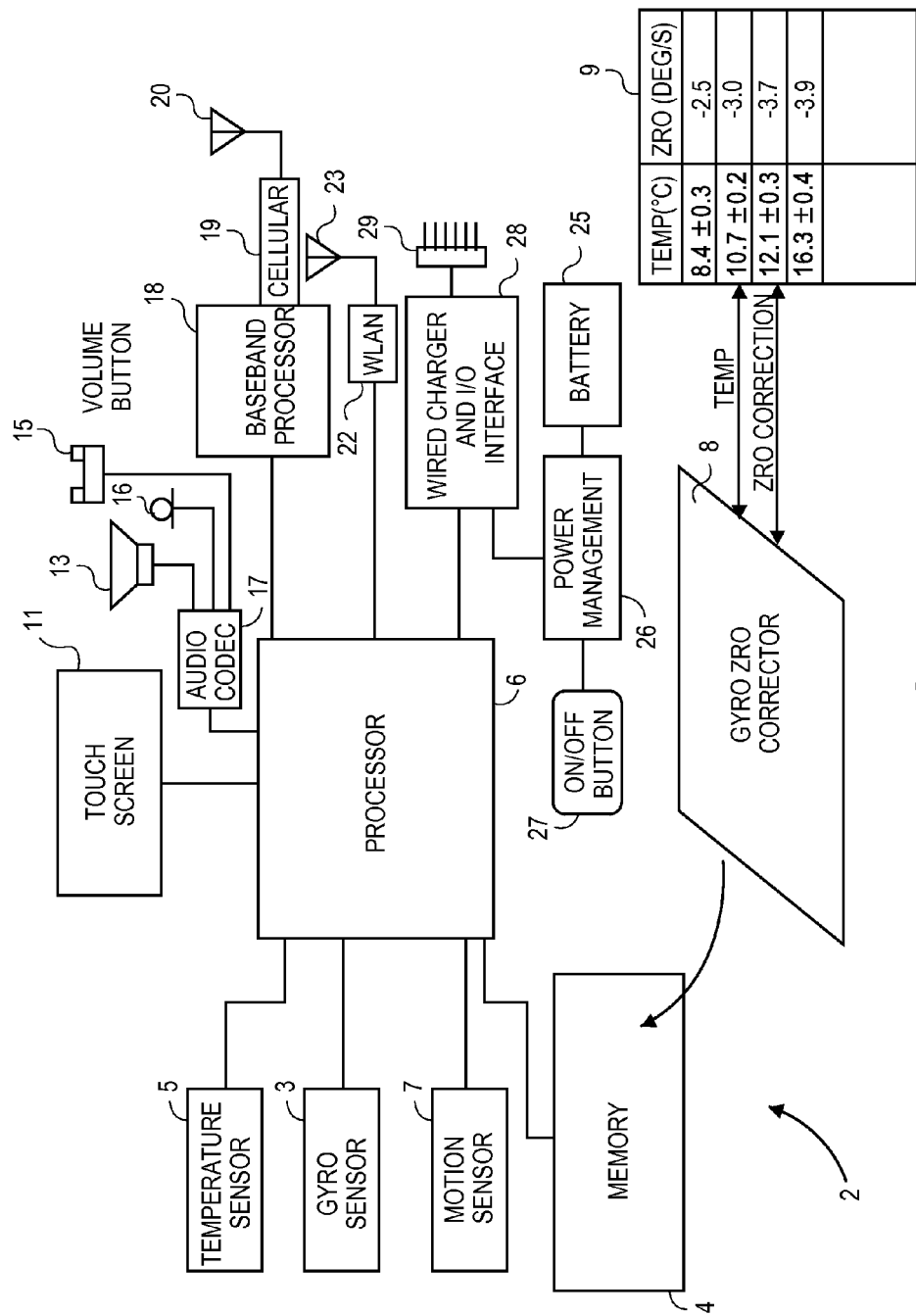
FIG. 2 is a block diagram of the constituent functional unit blocks and hardware components in an example multi-function handheld mobile device.

FIG. 2 shows a functional unit block diagram and some constituent hardware components of the personal mobile device 2, e.g. as found in an iPhone™ device by Apple Inc. Although not shown, the device 2 has a housing in which the primary mechanism for visual and tactile interaction with its user is a touch sensitive display screen (referred to here as a touch screen) 11. The housing may be essentially a solid volume referred to as a candy bar or chocolate bar types as in the iPhone device. An alternative is one that has a moveable, multi-piece housing, such as a clamshell design, or one with a sliding, physical keypad as used by other cellular and mobile handset or smart phone manufacturers. The touch screen 11 is used to display typical features of visual voicemail, web browser, email, and digital camera viewfinder, as well as others, and to receive input from the user via virtual buttons and touch commands.

For wireless telephony, which enables the user to receive and place audio and/or video calls, downlink audio during a call can be emitted from a speaker 13 (which may be an earpiece speaker or receiver, or it may be a headset earphone). Uplink audio includes the user's speech, which is picked up by a microphone 16 (e.g., mouthpiece microphone or headset microphone). Conversion between analog domain and digital domain for the speaker and microphone signals, in addition to digital audio signal processing for different applications running in the device 2, may be performed within audio codec 17. A physical volume switch or button 15 may also be connected to the codec. The codec 17 may be configured to operate in different modes, e.g. to service a digital media player function (such as an MP3 player that is playing back a music file that is stored in the device 2), as well as a wireless telephony function.

For wireless telephony, a baseband processor 18 is included to perform speech coding and decoding functions upon the uplink and downlink signals, respectively, in accordance with the specifications of a given protocol, e.g. cellular GSM, cellular CDMA, wireless VOIP. A cellular transceiver 19 receives the coded uplink signal from the baseband processor and up converts it to a carrier band before driving an antenna 20 with it, to reach a cellular network base station; it also receives a downlink signal from the base station via the antenna 20 and down converts the signal to baseband before passing it to the baseband processor 18. A wireless local area network transceiver 22 receives and transmits data packets from a nearby wireless router or access point, using an antenna 23.

Power is provided to operate the components shown in FIG. 2 by a battery 25 (generically used here to refer to a rechargeable power source that may also include a rechargeable fuel cell). The battery 25 is charged or replenished by an external power source such as a wall plug or automobile battery dc power adapter (not shown) that connects to a multi-pin docking connector 29 that is also integrated in the housing of the device 2. The connector 29 and its associated charger and I/O interface circuitry 28 may be in accordance with any suitable computer peripheral specification such as Universal Serial Bus (USB). The USB protocol allows for the connector 29 and its associated interface 28 to be used for both power transfer to recharge the battery 25 and for data I/O communications. The latter includes docking functions, to synchronize user content in the device 2 with another computer device owned by the user that may have substantially more data storage capacity, e.g. a desktop computer, a laptop/notebook computer.

The personal mobile device 2 presents a particularly challenging task for dissipating sufficient heat that is produced as a result of the various functions running inside its housing. A thermal management process is needed to make sure that critical temperature points or hot spots inside and on the outside surface of the housing do not exceed their maximum specifications; the process may be conducted with help from a power management unit (PMU) 26. The PMU 26 is typically implemented as a programmed processor, with associated analog and digital conversion circuitry, analog signal conditioning circuitry, and a data communications interface needed to control or communicate with other components of the device 2 (for purposes of thermal management.) The PMU 26 obtains temperature data (or temperature readings) from multiple temperature sensors, as well as power data (sensed or estimated power consumptions of certain power-hungry components), and then processes that data to make decisions that affect power consumption activity, in order to maintain specified thermal levels or temperature constraints for the device 2. For instance, if the back case of the device 2 is becoming too hot, then the PMU may decide to take any one or more several actions, including turning on a fan inside the device 2 to more quickly pull the hot air from inside the device 2, lowering the maximum output power of amplifiers used for audio playback and cellular transmission, and lowering the supply voltage and/or main clock signal frequency of a large processor. The PMU 26 may also include power supply circuitry with various regulated voltage outputs for supplying power to the components of the device 2. The PMU 26 may also be tasked with the orderly powering down and powering up the various components of the device 2, in response to system reset or the main power on/off switch 27 being actuated by the user.

The device 2 also includes a motion sensor 7 which may use an accelerometer to measure linear acceleration of the device 2 along a given axis. A gyro sensor 3 may use a MEMS type mechanical vibratory gyroscope to measure turn rate or angular velocity of the device 2 about a given axis. A temperature sensor 5 may use a thermistor to measure temperature of the gyro sensor 3. The temperature sensor 5 may be integrated with the gyro sensor 3 on the same integrated circuit die or alternatively in the same integrated circuit package.

The user-level functions of the device 2 are implemented under control of a processor 6 that has been programmed in accordance with instructions (code and data) stored in memory 4. The processor 6 and memory 4 are generically used here to refer any suitable combination of programmable data processing components and data storage that conduct the operations needed to implement the various functions of the device. The processor 6 may be an applications processor typically found in a smart phone, while the memory 4 may refer to microelectronic, non-volatile random access memory. An operating system may be stored in the memory 4, along with application programs specific to the various functions of the device, which are to be run or executed by the processor 6 to perform the various functions of the device 2. For instance, there may be a telephony application that (when launched, unsuspended, or brought to foreground) enables the user to "dial" a telephone number to initiate a telephone call using wireless VOIP or a cellular protocol and to "hang up" on the call when finished.

Figure 3:
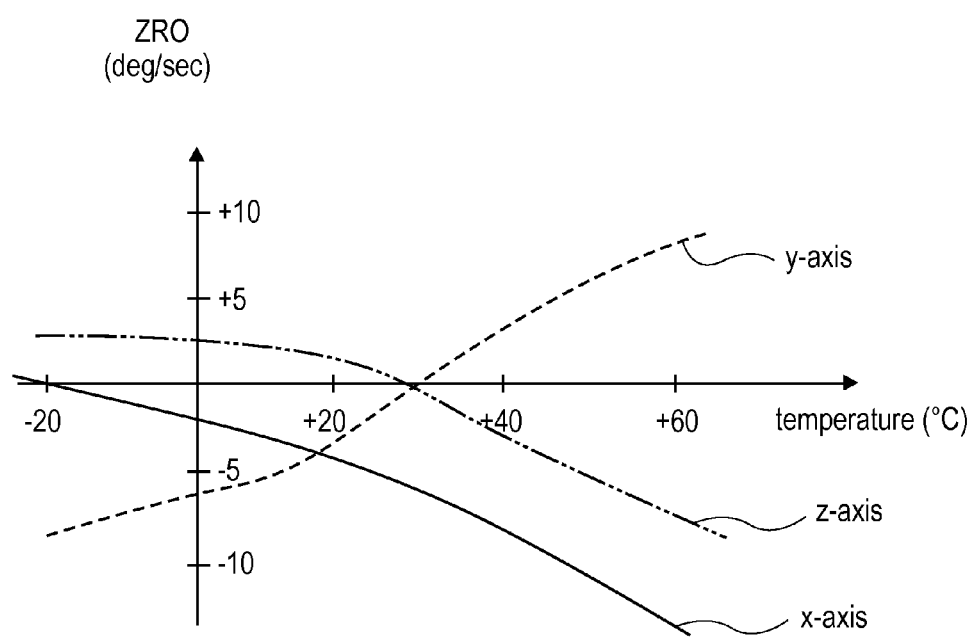
FIG. 3 is a graph of zero turn rate offset as a function of temperature, for a multi-axis gyro angular rate sensor.

As explained above, certain types of gyro sensors exhibit strong variation in their ZRO with temperature, and thus need to be corrected across their full, expected operating temperature range. FIG. 3 is a graph of ZRO as a function of expected operating temperature range, for an example multi-axis mechanical gyro. A corrected gyro reading can be obtained by subtracting the ZRO (that is specified for the current gyro temperature) from the current gyro output. The processor 6 may be programmed in accordance with a gyro ZRO corrector program module 8 (which may be stored in the memory 4), to achieve such a result.

Still referring to FIG. 2, the ZRO corrector 8 produces corrected gyro readings as follows. Specifically, the processor 6 is programmed to read the outputs of the gyro sensor 3 and the temperature sensor 5 within a relatively short time interval of each other, to determine gyro output at a particular temperature. A lookup table 9 stored in the device 2, e.g. in the memory 4, is then accessed using the particular temperature, to find a ZRO correction value associated with that temperature. For example, as seen in FIG. 2, if the temperature sensor 5 shows 10.7+/−0.2 Celsius, then the ZRO correction value to be applied to the read gyro output is −3.0 degrees/sec. The corrected gyro output value may then be passed to an application that needs to know the current angular velocity of the device 2 with good accuracy.

Figure 4:
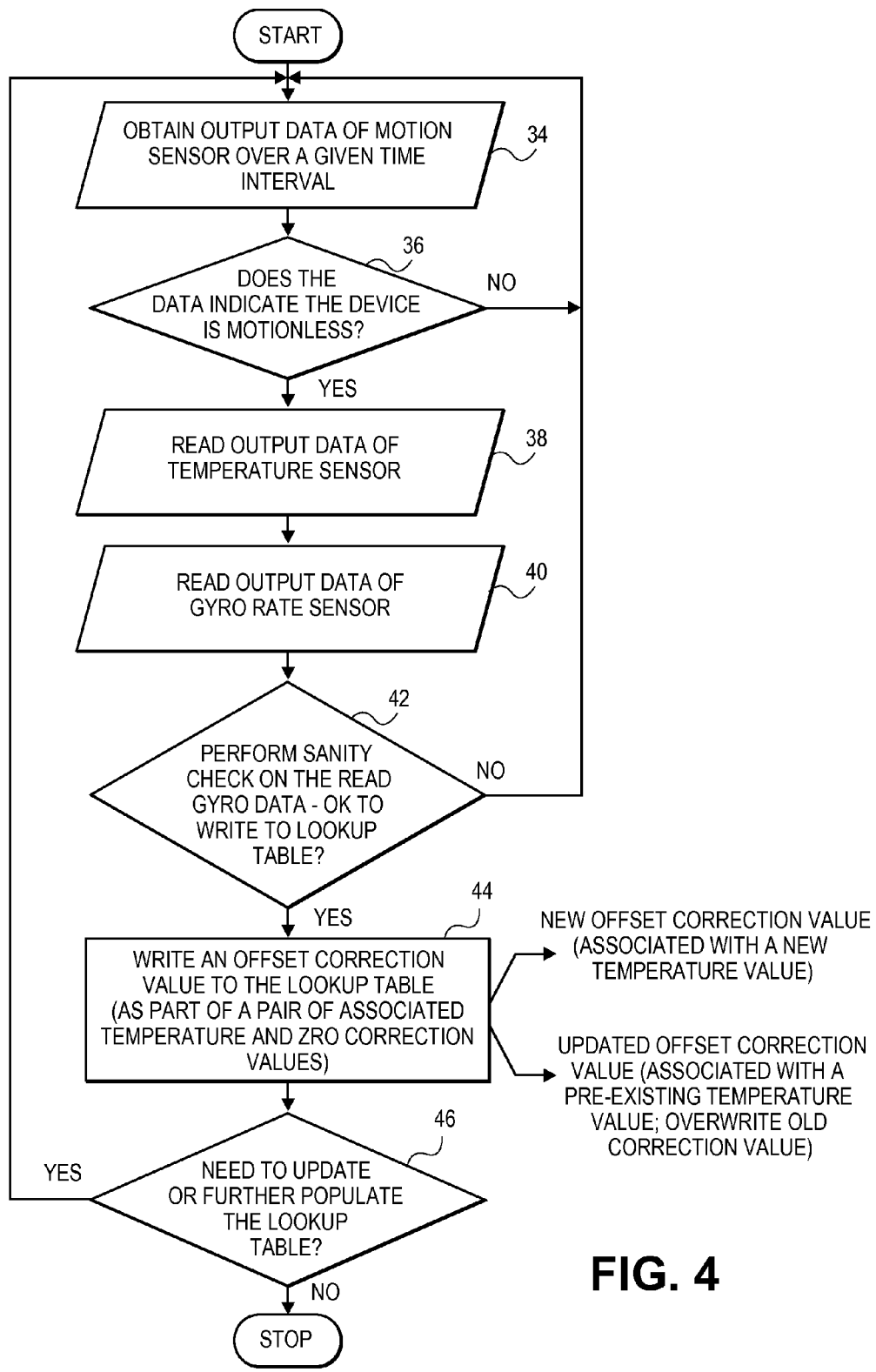
FIG. 4 is an algorithm or process flow for populating and updating a gyro zero turn rate offset correction lookup table.

Ideally, lookup table 9 should be filled, as depicted in the graph of FIG. 3, with temperature and ZRO values spanning the entire expected operating temperature range of the gyro and in sufficiently fine granularity. However, as explained below, this may not be practical at the time of manufacturing test of the device 2. The device 2 may be shipped from its factory with the lookup table 9 only partially filled. For example, the table 9 may initially contain only a few entries. This allows the device 2 to pass through manufacturing test more quickly. Once in-the-field, however, the ZRO corrector 8 may be used to advantageously program the processor 6 to automatically populate the table 9 with many more entries, while remaining inconspicuous to the end user. FIG. 4 shows an algorithm for such a process.

The algorithm may begin with the programmed processor automatically determining, during in-the-field use of the personal mobile device 2, that the device is in a motionless state. This is depicted in blocks 34 and 36 where output data of the motion sensor 7 is obtained over a given time interval. For example, samples from the output of an accelerometer may be taken for several seconds, and if the average of these samples is less than a selected threshold, such as 2% of what represents a motionless state (namely zero acceleration), then the data indicates that the device is motionless such that operation may continue with reading the output of the temperature sensor (block 38) and the output of the gyro turn rate sensor (block 40). Note also that in blocks 38 and 34 as part of the sensor readout operation, a smoothing function may be applied to a short sequence of raw output values from the sensors to obtain a single, representative value. For instance, the actual output data that is evaluated or used in a subsequent operation below may be an average of several samples taken from the respective sensor, so as to smooth out the effects of noise in instantaneous readings from the sensors, or to ensure that the raw values are reasonably stable before using them.

Next, skipping to operation 44, the read gyro output is written to the lookup table 9 as an offset correction value, as part of a pair of associated temperature and ZRO correction values. If the gyro output value is associated with a new temperature value, that is, one not previously existing in the table, then this is considered a new offset correction value and is therefore written into a new entry (together with the temperature value that was read in block 38). On the other hand, if the temperature value from block 38 matches a preexisting temperature value in the lookup table, then operation 44 essentially updates or overwrites the old ZRO correction value of that entry in the table 9. The process then may repeat with blocks 34-44, if there is a need to update or further populate the entries in the lookup table. For instance, the process in FIG. 4 may be repeated each time a significant period of time has elapsed since the table 9 was deemed to be complete, so as to ensure that any drifts or variations in the gyro sensor 3 are recaptured and corrected. The process may also be triggered when the table 9 does not yet have sufficient coverage for the full, expected operating temperature range of the gyro sensor 3.

Figure 5:
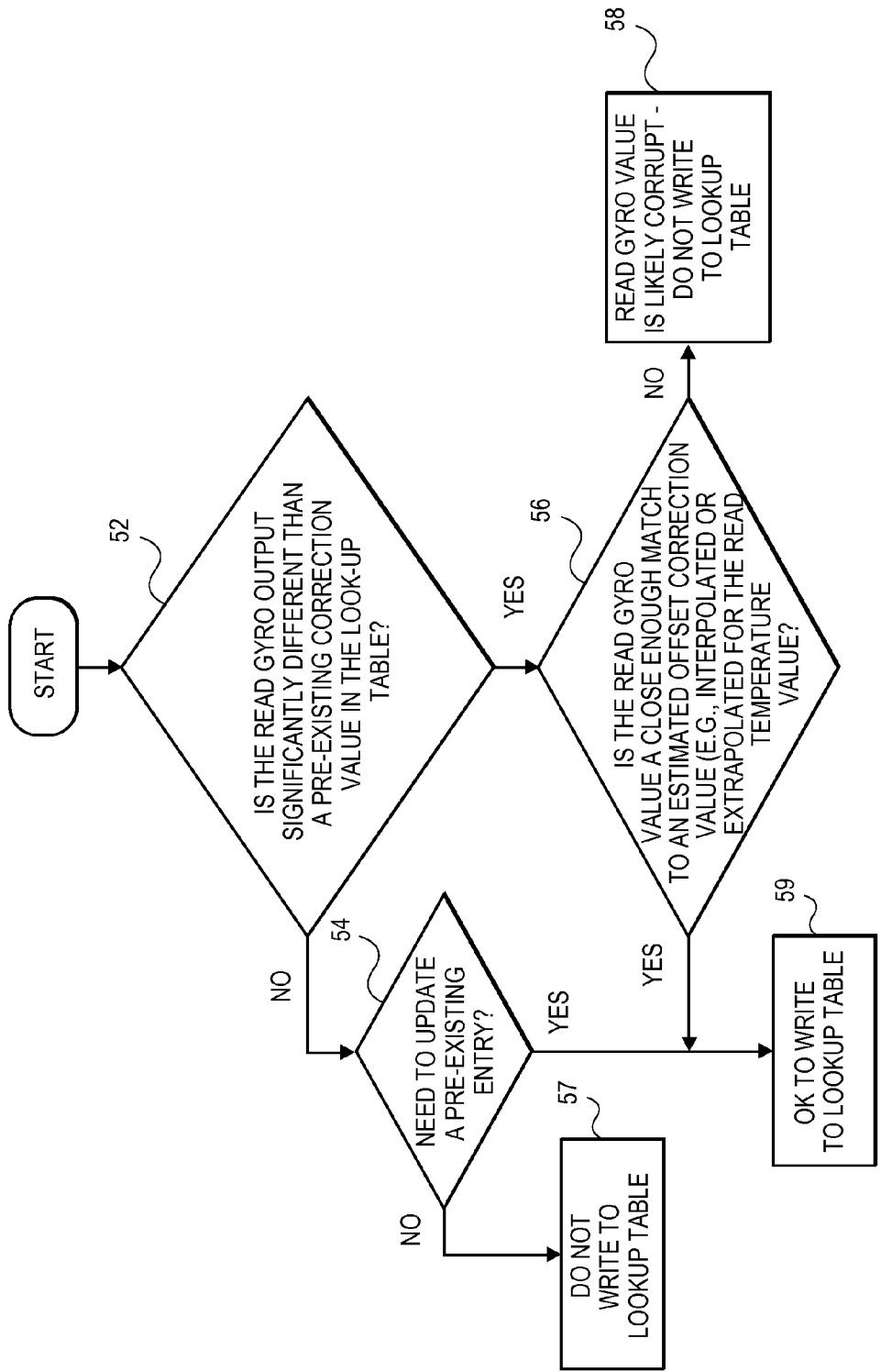
FIG. 5 is an algorithm or process flow for performing a sanity check on a read, gyro zero turn rate offset value.

Still referring to FIG. 4, the programmed processor 6 may also perform a sanity check on a read gyro output, before deciding it is proper to write it to the lookup table as a new or updated correction value (block 42). While the operation in block 42 is not necessary in all instances, it does help prevent the table 9 from being populated with possibly corrupt values or clearly incorrect values, especially since the process of FIG. 4 is being performed in-the-field essentially inconspicuous to the end user, and thus may be subject to unexpected events that could interfere with operation of the gyro sensor. If the sanity check is cleared, then operation proceeds with block 44 as described above, to write to the table 9. If, however, the sanity check indicates a problem, then one or more of the prior operations depicted in FIG. 4 should be repeated. For instance, the output data of the gyro rate sensor may be re-sampled through operation 40 and subjected to the sanity check again, to make sure that an incorrect offset correction value is not written to the table 9. FIG. 5 shows an algorithm for the sanity check process.

Referring to FIG. 5, operation begins with block 52 in which the read temperature and gyro outputs are compared to preexisting temperature and offset correction pairs in the table 9, to determine whether the read gyro output value is significantly different than a pre-existing correction value that is associated with a temperature value that is close to the read or current temperature. In one case, the comparison is made with a preexisting pair that was written to the table 9 in the factory. In other words, the in-the-field ZRO value is checked against a ZRO correction value that was determined at the factory during a manufacturing test, for example, that was under well-controlled conditions (resulting in correct gyro values).

If the in-the-field read gyro output is significantly different than a preexisting value from the table 9, then operation may proceed with block 56 to determine whether the in-the-field read temperature and gyro outputs are close enough to an estimated pair. This may be the situation where a new temperature is quite different than those already in the table 9. An interpolation or extrapolation procedure may be performed to determine an estimate of ZRO, for instance based on the preexisting data in the table 9, at the new temperature value. If the read gyro output is not close enough to the estimated value, then it is likely that the read gyro output is incorrect or corrupted, in which case it should not be written to the lookup table (block 58). This corresponds to the situation where for instance there may have been interference due to acoustic vibrations in the device 2 that may not have been picked up by the motion sensor 7, but that nevertheless interact with the mechanical structure of the gyro sensor 3 to corrupt the gyro output. It may be, for instance, that an acoustic vibration at approximately the mechanical resonant frequency of the gyro sensor 3 is occurring during readout, where such acoustic vibrations may have been created by sound emitted from a built-in speaker of the device 2. This could be the situation where the user has placed the device 2 on a table (such that the device is motionless), but has turned on the digital media player application and the latter is playing music through the built-in speakerphone or loudspeaker of the device 2. In that situation, the process in FIG. 5 will detect that there is a problem with the gyro zero rate output and therefore ignore that value (for purposes of updating or writing to the lookup table).

Still referring to FIG. 5, and returning to operation 52, if the read temperature and gyro outputs are close enough to a preexisting temperature and offset correction value pair, then a decision should be made next as to whether the preexisting pair in the table 9 needs to be updated or overwritten (operation 54). For instance, each entry in the lookup table may be tagged with a date, such that if an entry is deemed to be old, then it should be updated or overwritten with a new reading. In that case, the process in FIG. 5 indicates that the current or read temperature and gyro output values should be written to the lookup table (operation 59). The latter result is also obtained if, returning now to operation 56, the read gyro output is close enough to an estimated ZRO correction value. Finally, there may be instances where the read temperature and gyro outputs so closely match a preexisting pair in the lookup table that there is no need to update the table—this result is indicated in operation 57.

As explained above, an embodiment of the invention may be a machine-readable medium (such as microelectronic memory) having stored thereon instructions, which program one or more data processing components (generically referred to here as a "processor") to perform the gyro and temperature sensor output data processing operations described above, including reading from and writing to a ZRO correction lookup table. In other embodiments, some of these operations might be performed by specific hardware components that contain hardwired logic (e.g., dedicated state machines). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A personal mobile device comprising:
   a multi-function handheld portable device housing in which are integrated
   a display screen;
   a wireless communications transceiver;
   a battery charger interface;
   a temperature sensor;
   a movement sensor that generates data indicative of linear movement of the device;
   a gyro sensor having a zero turn rate output that is capable of containing an offset;
   storage that stores a plurality of gyro zero turn rate offset correction values associated a plurality of different temperature values, respectively; and
   a programmed processor to access the plurality of gyro zero turn rate offset correction values for correcting an output value of the gyro sensor for zero turn rate offset, wherein the programmed processor is to
   (a) automatically determine, during in-the-field use of the personal mobile device, when the device is in a motionless state by determining when output from the movement sensor remains within a predetermined zero threshold range for a predetermined time interval and (b) based on gyro sensor output, add a zero turn rate offset correction value to the plurality of gyro zero turn rate offset correction values as a part of a pair of associated temperature and zero turn rate offset correction values.

2. The mobile device of claim 1 wherein the programmed processor is to repeatedly perform (a)-(b), during in-the-field use of the device, as the device encounters a range of different temperatures.

3. The mobile device of claim 1 wherein the temperature sensor and the gyro sensor are integrated in the same integrated circuit package.

4. The mobile device of claim 1 wherein the movement sensor is an accelerometer that generates data indicative of linear acceleration of the device.

5. The mobile device of claim 1 wherein the programmed processor is to, prior to adding the offset correction value, determine if a read gyro output is within an expected range for zero turn rate offset, ZRO, wherein the expected ZRO range is computed based on one or more pre-existing pairs of associated temperature and zero rate offset correction values in the storage.

6. The mobile device of claim 1 wherein the programmed processor is to, prior to adding the offset correction value, estimate a zero rate offset correction value associated with a read output of the temperature sensor, based on pre-existing data stored in the device that describes variation of the gyro sensor's zero rate offset over temperature, and then compares a read gyro output to the estimated zero rate offset correction value.

7. A personal mobile device comprising:
   a gyro sensor having a zero turn rate output that is capable of containing an offset;
   an accelerometer that generates data indicative of linear acceleration of the device;

storage containing a plurality of initial entries that were written to the storage during manufacturing test of the device, wherein each entry includes a different temperature value and a respective gyro zero turn rate offset correction value; and a programmed processor to access the storage to correct an output of the gyro sensor for zero turn rate offset, wherein the programmed processor is to add a plurality of new entries to the storage during in-the-field use of the device, wherein for each new entry the programmed processor is to (a) automatically determine that the device is in a motionless state by determining when output from the accelerometer remains within a predetermined zero threshold range for a predetermined time interval, and (b) based on gyro sensor output, add a zero turn rate offset correction value to the storage as part of a pair of associated temperature and zero turn rate offset correction values included in the new entry.

8. The mobile device of claim 7 wherein the programmed processor is to verify a gyro output before adding a zero turn rate offset correction value to the storage, by comparing the gyro output to a pre-existing offset correction value in the storage.

9. The mobile device of claim 7 wherein the programmed processor is to compute an estimated offset correction value that is associated with the temperature of the gyro sensor, based on previously stored data in the device that describes variation of the gyro sensor's zero rate offset over temperature, and wherein the programmed processor is to, before adding a zero turn rate offset correction value to the storage compare a gyro output to the estimated offset correction value.

10. A method for operating a personal mobile device having a gyro sensor, comprising:

correcting an output of a gyro sensor in the device by accessing a plurality of storage entries some of which were stored during manufacturing test of the device, wherein each entry includes a different temperature value and a respective gyro zero turn rate offset correction value; and adding a plurality of new entries to the storage during in-the-field use of the device, by, for each new entry,
determining that the device is in a motionless state by determining when output from a motion sensor remains within a predetermined zero threshold range for a predetermined time interval and
adding a zero turn rate offset correct value, based on gyro sensor output, as part of a pair of associated temperature and zero turn rate offset correction values included in the new entry.

11. The method of claim 10 further comprising:
before adding a zero turn rate offset correction value, comparing a gyro value to one or more offset correction values stored in the table.

12. The method of claim 10 further comprising:
before adding a zero turn rate offset correction value, comparing a gyro value to an estimated offset correction value that is associated with a determined temperature of the gyro sensor.

13. The method of claim 12 further comprising:
computing the estimated offset correction value based on previously stored data in the device that describes variation of the gyro sensor's zero rate offset over temperature.

* * * * *

UNITED STATES PATENT AND TRADEMARK OFFICE
CERTIFICATE OF CORRECTION

| | | |
|---|---|---|
| PATENT NO. | : 8,577,633 B2 | Page 1 of 1 |
| APPLICATION NO. | : 12/794531 | |
| DATED | : November 5, 2013 | |
| INVENTOR(S) | : Parin Patel | |

It is certified that error appears in the above-identified patent and that said Letters Patent is hereby corrected as shown below:

In the Claims

In Claim 1, column 8, line 23, after "associated" insert -- with --.

In Claim 9, column 9, line 31, delete "storage" and insert -- storage, --.

In Claim 10, column 10, line 15, delete "correct" and insert -- correction --.

Signed and Sealed this
Seventeenth Day of June, 2014

Michelle K. Lee
*Deputy Director of the United States Patent and Trademark Office*